United States Patent
Colpaert et al.

[11] B 3,983,969
[45] Oct. 5, 1976

[54] DISC BRAKE CALIPER AND FRICTION PAD MOUNTING

[75] Inventors: James J. Colpaert; William J. Kestermeier, both of South Bend, Ind.

[73] Assignee: The Bendix Corporation, South Bend, Ind.

[22] Filed: Dec. 16, 1974

[21] Appl. No.: 533,056

[44] Published under the second Trial Voluntary Protest Program on January 13, 1976 as document No. B 533,056.

[52] U.S. Cl. .............................. 188/73.6; 188/72.4
[51] Int. Cl.² ................. F16D 55/224; F16D 65/02
[58] Field of Search................ 188/72.4, 73.3, 73.6, 188/18 A

[56] References Cited
UNITED STATES PATENTS

| | | | |
|---|---|---|---|
| 3,261,430 | 7/1966 | Wilson et al. | 188/73.6 |
| 3,384,203 | 5/1968 | Walther et al. | 188/73.6 |
| 3,495,689 | 2/1970 | Peach | 188/72.4 |
| 3,525,420 | 8/1970 | Honick et al. | 188/72.4 |
| 3,800,923 | 4/1974 | Rike | 188/73.6 |

FOREIGN PATENTS OR APPLICATIONS

| 967,408 | 8/1964 | United Kingdom | 188/18 A |
|---|---|---|---|

Primary Examiner—Trygve M. Blix
Assistant Examiner—Edward R. Kazenske
Attorney, Agent, or Firm—Ken C. Decker; William N. Antonis

[57] ABSTRACT

A disc brake for an automotive vehicle is disclosed in which the inner friction element is provided with a pair of arms extending from opposite ends thereof. The arms are provided with grooves (or projections) which are adapted to slidably engage axially extending splines (or grooves) which are provided on the bridge portion of the caliper so that the inner friction element is guided for sliding movement in a direction parallel to the axis of rotation of the rotor. A gap is defined between the ends of the splines and the inwardly extending portion of the caliper to permit insertion of the arms into the gap and movement of the inner friction pad onto the splines when the brake is assembled. The outer friction element is then installed on the inwardly extending portion of the caliper and encloses a sufficient portion of the gap to prevent the inner friction element from escaping. A pair of pins slidably mount the caliper to a non-rotating portion of the vehicle, such as the spindle housing.

1 Claim, 4 Drawing Figures

DISC BRAKE CALIPER AND FRICTION PAD MOUNTING

BACKGROUND OF THE INVENTION

This invention relates to a disc brake for an automotive vehicle.

For obvious reasons, it is desirable in any disc brake design to provide a common basic caliper construction which may be used on several different vehicles, which may vary in their requirement for the size of the friction elements. It is also desirable to furnish a disc brake to a vehicle manufacturer in which the entire brake is shipped as a unit, ready for assembly to the vehicle at the assembly plant. Some existing caliper disc brakes must be shipped in more than one piece. For example, the torque member or fixed support, the caliper, and the inner brake shoe which anchors on the fixed support, must now be shipped separately to the vehicle manufacturer. Because of the modern trend to smaller vehicles and consequent smaller wheel sizes, it is also necessary that any caliper disc brake be as compact as possible, so that it may be fitted to the widest possible variety of vehicles.

SUMMARY OF THE INVENTION

Therefore, an important object of our invention is to provide a disc brake for an automotive vehicle in which the area of the friction elements engaging the rotor may be varied over a relatively wide range to adapt the brake to varying vehicle designs.

Another important object of our invention is to permit the area of the friction pad to be varied without requiring any substantial change in the caliper.

Another important object of our invention is to provide an automotive disc brake which is shipped as an integral unit with both friction pads mounted on the caliper, so that the only assembly which need be accomplished at the vehicle assembly plant is installation of the caliper on the vehicle spindle.

Still another important object of our invention is to provide a disc brake for an automotive vehicle that is sufficiently compact to permit it to be installed on subcompact vehicles.

DETAILED DESCRIPTION

Figure 1:
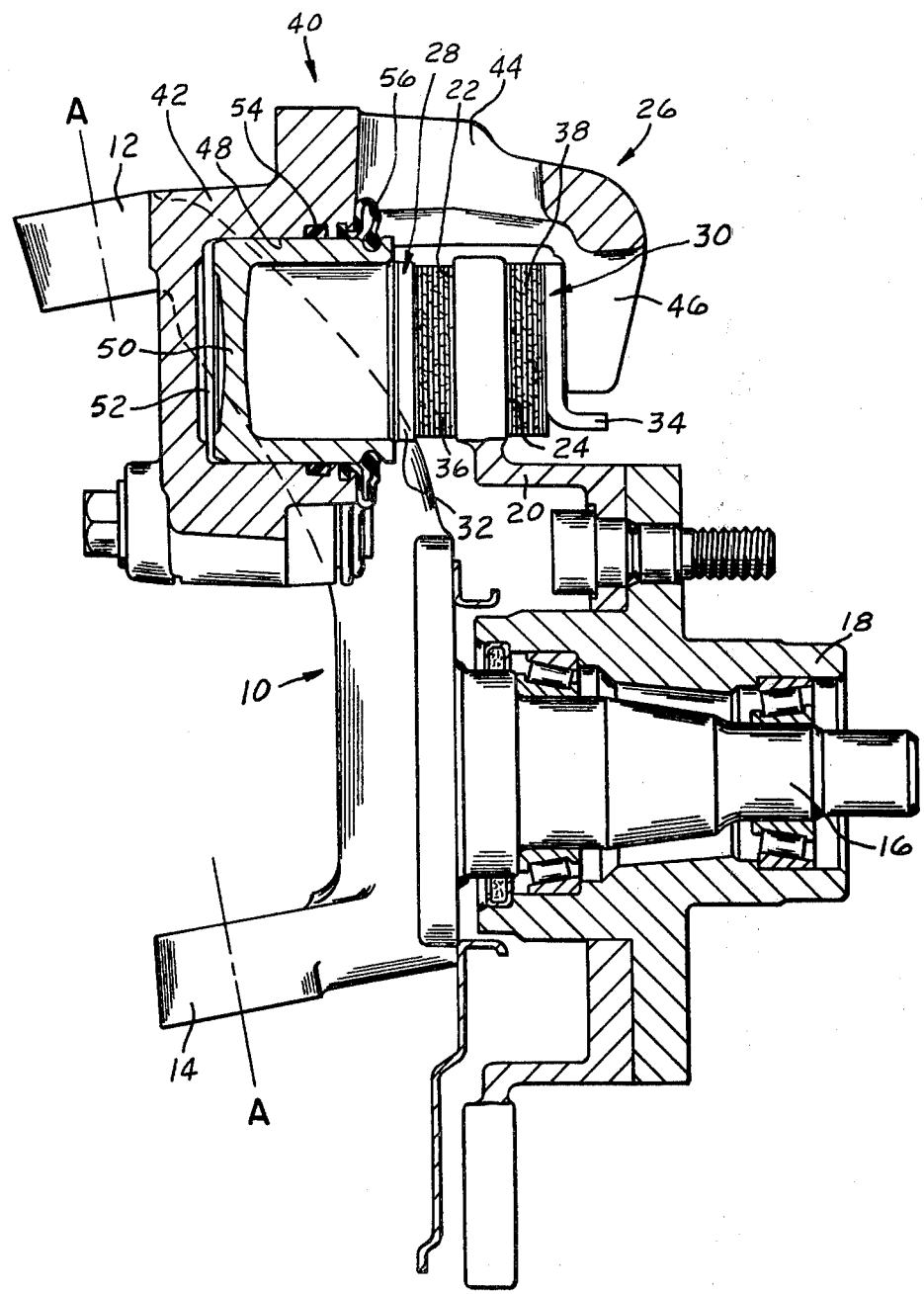
FIG. 1 is a cross-sectional view of a brake made pursuant to the teachings of our present invention and which is illustrated in its installed position on the vehicle axle spindle.
Figure 2:
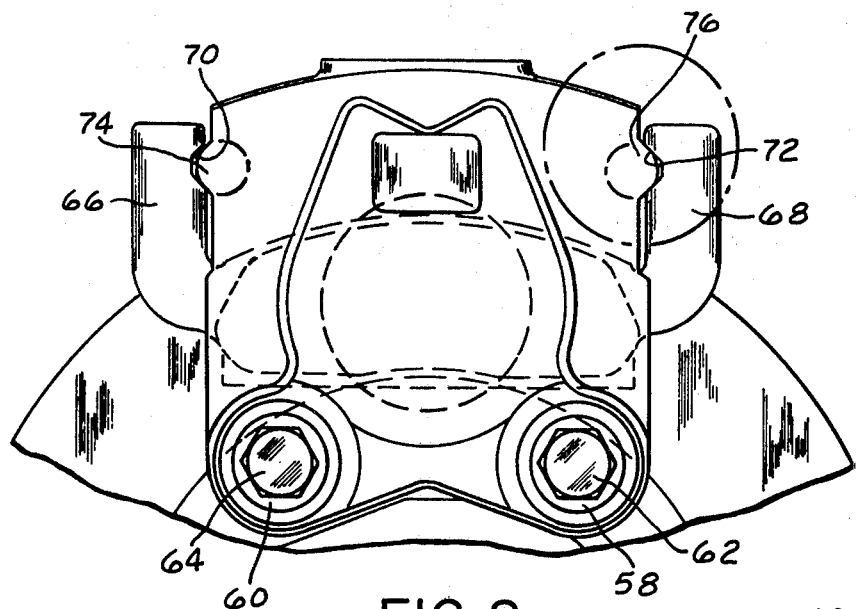
FIG. 2 is a side-elevational view of the left-hand side of the brake illustrated in FIG. 1.

Referring now to the drawing, a spindle housing generally indicated by the numeral 10 includes an upper ball joint support 12 and a lower ball joint support 14. Ball joint supports 12 and 14 are connected to the appropriate portions of the vehicle to permit the spindle housing 10 to articulate with respect to the vehicle about the axis A—A which extends through the supports 12 and 14. Spindle housing 10 carries a spindle 16 which rotatably mounts a vehicle hub 18. The disc brake rotor 20 is bolted to the hub 18 and includes a pair of opposed friction faces 22, 24.

A disc brake generally indicated by the numeral 26 includes an inner friction element 28 which is disposed adjacent the friction face 22 and an outer friction element 30 which is disposed adjacent the friction face 24. The friction elements 28, 30 each include backing plates 32, 34 on which the friction material 36, 38 is secured in any manner well known to those skilled in the art. A caliper housing generally indicated by the numeral 40 includes a fluid motor portion 42 which is disposed adjacent the friction face 22, a bridge portion 44 which extends from fluid motor portion 42 and which traverses the friction elements 28, 30 and the periphery of the rotor 20, and an inwardly extending portion 46 which extends radially inwardly from the bridge portion 44 substantially parallel to the friction face 24. The friction element 30 is rigidly secured to the inwardly extending portion 46 and moves therewith. The fluid motor portion 42 defines a bore 48 therewithin which slidably receives a piston 50 which cooperates with the closed end of the bore 48 to define a variable volume chamber 52 therebetween. Chamber 52 is communicated to an appropriate fluid pressure source (not shown), such as the vehicle master cylinder, which communicates high pressure fluid to the chamber 52 when a brake application is effected. A seal 54 seals the chamber 52 and also acts on the piston 50 during release of the brake to restore the latter to the brake release position in the manner disclosed in U.S. Pat. No. 3,377,076, owned by the assignee of the present invention and incorporated herein by reference. A conventional boot 56 is provided to prevent entry of contaminants into the bore 48.

The lower edge of the fluid motor portion 42 is provided with a pair of apertures 58, 60 which slidably receive pins 62, 64 which fasten to the spindle housing 10, to install the brake 26 onto the vehicle. The pins 62, 64 are of the type more completely disclosed in U.S. Pat. application Ser. No. 471,266 filed Apr. 16, 1974, owned by the assignee of the present invention and incorporated herein by reference. Consequently, the caliper 40 is mounted for sliding movement toward and away from the disc 20 along an axis substantially parallel to the axis of the spindle 16 on which the rotor 20 turns.

Figure 3:
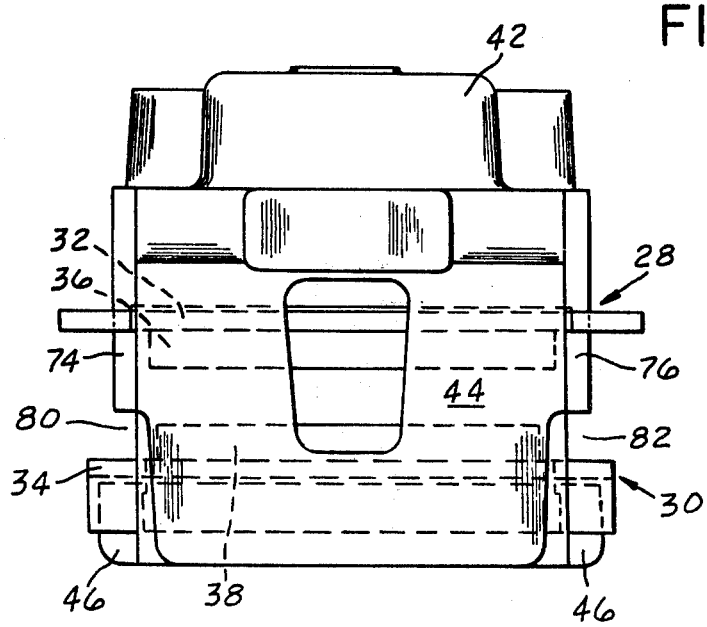
FIG. 3 is a top plan view of the brake illustrated in FIGS. 1 and 2.

Opposite ends of the backing plate 32 of the friction element 28 are provided with arms 66, 68 which extend outwardly and upwardly with respect to the friction element 28. The arms 66, 68 are provided with grooves 70, 72 which face one another. Splines 74, 76 are provided on opposite edges of the bridge portion 44 and extend substantially parallel to the axis of the spindle 16. Grooves 70, 72 receive the splines 74, 76 respectively, to thereby restrain the friction element 28 for movement relative to the caliper housing 40 in a direction substantially parallel to the axis of the spindle 16. Referring now to FIG. 3, it will be noted that the splines 74, 76 terminate short of the point on the bridge portion 44 from which the inwardly extending portion 46 extends to define gaps 80, 82. The gaps 80, 82 are wide enough to permit the arms 66, 68 to be inserted radially into the gaps, and then moved axially to install the grooves 70, 72 on the splines 74, 76. The outer friction element 30 is then secured to the inwardly extending portion 46. It will be noted that after installation of the outer friction element 30, the gaps 80, 82 are closed sufficiently so that engagement of the elements 28, 30 will prevent the arms 66, 68 from moving into the gaps, thereby maintaining the inner friction element 28 on the caliper 40. Furthermore, since the pins 62, 64 may be installed in their corresponding apertures 58, 60 when the brake is assembled, the entire unit may be shipped as a complete assembly to the vehicle manufacturer's assembly plant. Consequently, the vehicle manufacturer need only mount the caliper 40 in position over the rotor 20 and then fasten the pins 62, 64 to the spindle 10.

In operation, the brake functions the same as any common hydraulically actuated disc brake. When a brake application is effected, fluid pressure is communicated into the chamber 52, where it reacts on the face of the piston 50 to urge the latter to the right viewing the FIG. 1. Movement of the piston 50 to the right urges friction element 28 into braking engagement with the friction face 22. Because the caliper 40 is slidably mounted on the spindle housing 10 due to the slidable connection between the pins 62, 64 and the corresponding apertures 58, 60, the reaction forces acting through the bridge portion 44 will cause the inwardly extending portion 46 to move to the left, viewing FIG. 1, thereby urging the friction element 30 into braking engagement with the friction face 24. As with any braking device, repeated brake applications will cause wear of the friction material 36, 38 which forms a part of the friction elements 28 and 30. Retraction of the friction element 28, 30 is maintained constant because of the constant retraction feature of the seal 54 as described in the aforementioned U.S. Pat. No. 3,377,076. However, the inner friction element 28 slides on the splines 74, 76 to permit the friction backing plate 32 to approach the friction face 22 as the lining 36 wears.

ALTERNATE EMBODIMENT

Figure 4:
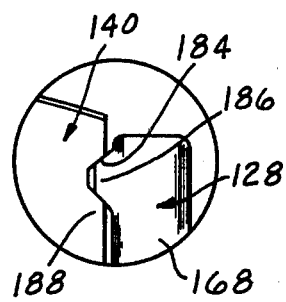
FIG. 4 is a view of the circumscribed portion of FIG. 2, but illustrating another embodiment of the invention.

Referring now to the embodiment of FIG. 4, elements substantially the same as those in the preferred embodiment, are increased by 100. In FIG. 4, the caliper 140 is provided with a groove 184 which receives a spline 186 projecting from the arm 168 of the friction pad 128. A portion of the lower edge 188 is cut away to define a gap (not shown) adjacent the inwardly extending portion (not shown) of the caliper 140. This gap corresponds to the gap 82 in the preferred embodiment and permits installation of the pad 128 onto the caliper 140, in exactly the same manner as in the preferred embodiment.

We claim:

1. In a disc brake:
   a rotor having a pair of friction faces;
   a fixed support disposed adjacent said rotor;
   a caliper slidably mounted on said fixed support for movement generally parallel to the axis of rotation of said rotor, said caliper including a fluid motor portion disposed adjacent one of said friction faces, an integral bridge member extending from said fluid motor portion and traversing the periphery of said rotor, and an inwardly extending portion extending from said bridge portion substantially parallel to the other friction face;
   a pair of friction elements disposed adjacent each of said friction faces, each of said friction elements including a backing plate having a pair of circumferentially spaced edges, and a pair of radially separated edges interconnecting said circumferentially spaced edges, said bridge portion defining a pair of circumferentially spaced edges located radially outwardly from the circumferentially spaced edges of said friction elements;
   said circumferentially spaced edges of said bridge portion defining torque receiving surfaces, one of said friction elements being disposed between said fluid motor portion and said one face of the rotor and having a pair of arms extending radially outwardly from the circumferentially spaced edges of said one friction element, said arms including a pair of facing edges defining a recess therebetween receiving said bridge portion, said arms further including torque transmitting surfaces cooperating with the torque receiving edges on said bridge portion to transmit braking torque generated by engagement of said friction element with said one friction face to said torque receiving surfaces carried by said bridge portion, said one friction element being otherwise free of restraint by said caliper and said torque member so that all of the braking torque generated by engagement of said one friction element with said one friction face is transmitted through a corresponding one of said arms to a corresponding torque receiving surface;
   said other friction element being carried by said inwardly extending portion;
   said torque transmitting and receiving surfaces comprising cooperating sets of splines and grooves;
   said splines terminating short of the connection between the bridge member and the inwardly extending portion to define a gap between the end of each spline and said inwardly extending portion;
   said other friction element when installed on said inwardly extending portion being adapted to engage said one friction element upon movement of the arm members toward their corresponding gaps to prevent movement of the arms into said gaps to thereby assure retention of said one friction element on said caliper.

* * * * *